United States Patent
Yu et al.

(10) Patent No.: US 9,445,113 B2
(45) Date of Patent: Sep. 13, 2016

(54) METHODS AND APPARATUS FOR PARALLEL IMPLEMENTATIONS OF 4:4:4 CODING

(75) Inventors: Haoping Yu, Carmel, IN (US); Gregory William Cook, Lafayette, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 2281 days.

(21) Appl. No.: 12/087,389

(22) PCT Filed: Jan. 9, 2007

(86) PCT No.: PCT/US2007/000316
§ 371 (c)(1),
(2), (4) Date: Jul. 1, 2008

(87) PCT Pub. No.: WO2007/081821
PCT Pub. Date: Jul. 19, 2007

(65) Prior Publication Data
US 2008/0317126 A1    Dec. 25, 2008

Related U.S. Application Data

(60) Provisional application No. 60/757,661, filed on Jan. 10, 2006.

(51) Int. Cl.
*H04N 7/12* (2006.01)
*H04N 19/436* (2014.01)
(Continued)

(52) U.S. Cl.
CPC ............ *H04N 19/436* (2014.11); *H04N 19/11* (2014.11); *H04N 19/147* (2014.11); *H04N 19/176* (2014.11); *H04N 19/593* (2014.11); *H04N 19/61* (2014.11)

(58) Field of Classification Search
CPC ............ H04N 19/176; H04N 19/147; H04N 19/436; H04N 19/593; H04N 19/11; H04N 19/61
USPC ....................... 375/240.01–240.29
IPC ...................................... H04N 7/12
See application file for complete search history.

(56) References Cited

U.S. PATENT DOCUMENTS 5,414,469 A * 5/1995 Gonzales et al. ........ 375/240.18
2005/0013363 A1   1/2005 Cho et al.
(Continued)

FOREIGN PATENT DOCUMENTS

JP    11215506    6/1999
JP    2005039842    2/2005
(Continued)

OTHER PUBLICATIONS

Ruan et al. , "New cost function for motion estimation in MPEG encoding using LNS", Proc. SPIE 5559, 123 (2004); doi:10.1117/12.560004.*

(Continued)

*Primary Examiner* — Y Lee
*Assistant Examiner* — Richard Carter
(74) *Attorney, Agent, or Firm* — Brian J. Dorini; Patricia A. Verlangieri (57) ABSTRACT

There are provided methods and apparatus for parallel implementations of 4:4:4 coding. A video encoder for encoding video signal data for an image block includes an encoder for encoding all color components of the image block by selecting a common block partition and a common spatial prediction mode. The common block partition and the common spatial prediction mode are selected by concurrently evaluating all of the color components in parallel.

22 Claims, 11 Drawing Sheets (51) Int. Cl.
*H04N 19/176* (2014.01)
*H04N 19/147* (2014.01)
*H04N 19/61* (2014.01)
*H04N 19/593* (2014.01)
*H04N 19/11* (2014.01)

(56) References Cited

U.S. PATENT DOCUMENTS

| | | | |
|---|---|---|---|
| 2005/0141608 | A1 | 6/2005 | Shin et al. |
| 2006/0203913 | A1 | 9/2006 | Kim et al. |
| 2009/0034856 | A1 | 2/2009 | Moriya et al. |
| 2009/0257491 | A1 | 10/2009 | Kondo et al. |

FOREIGN PATENT DOCUMENTS

| | | |
|---|---|---|
| JP | 2006246474 | 9/2006 |
| KR | 19960703308 | 6/1996 |
| KR | 19980020898 | 6/1998 |
| KR | 1020050070984 | 7/2005 |
| KR | 1020050105271 | 11/2005 |
| WO | WO9530311 | 11/1995 |
| WO | WO2004080050 | 9/2004 |
| WO | WO2006112653 | 10/2006 |
| WO | WO2007010690 | 1/2007 |
| WO | WO2007010901 | 1/2007 |

OTHER PUBLICATIONS

Yu, Haoping, "Joint 4:4:4 Video Model (J4VM)1", Joint Video Team (JVT) of ISO/IEC MPEG & ITU-T VCEG (ISO/IEC JTC1/SC29/WG11 and ITU-T SG16 Q6), Dec. 1, 2005, N7653, XP-030014177.
Chen, L-G. et al., "Analysis, Fast Algorithm, and VLSI Architecture Design for H.264/AVC Intra Frame Coder", IEEE Transactions on Circuits and Systems for Video Technology, vol. 15, No. 3 , Mar. 1, 2005, XP001225785.
Huang et al.: "Hardware Architecture Design for H.264/AVC Intra Frame Coder," Circuits and Systems, 2004, ISCAS, Proceedings of the 2004 International Symposium in Vancouver, BC, Canada, May 23-26, Piscataway, NJ, IEEE, vol. 2, No. 23, pp. 26-272, XP010720157.
Wittmann, et al.: "Intra-only 4:4:4 Profile for H.264/AVC FRExt," Joint Video Team (JVT) of ISO/IEC MPEG & ITU-T VCEG (ISO/IEC JTC1/SC29/WG11 and ITU-T SG16 Q.6), 17th Meeting, Nice, France, Oct. 14-21, 2005, pp. 1-18, XP002441181.
Jamil-Ur-Rehman, et al.: "Fast Intra Prediction Mode Decision Using Parallel Processing," Proceedings of the Fourth International Conference on Machine Learning and Cybernetics, Guangzhou, Aug. 18-21, 2005, pp. 5094-5098, XP010847681.
Search Report Dated Aug. 7, 2007.
International Telecommunication Union, "Advanced Video Coding for Generic Audiovisual Services", Series H: Audiovisual and Multimedia Systems—Infrastructure of Audiovisual Services—Coding of Moving Video, ITU-T H.264, Mar. 2005.
Huang et al., "Analysis, Fast Algorithm, and VLSI Architecture Design for H.264/AVC Intra Frame Coder", IEEE Transactions on Circuits and Systems for Video Technology, vol. 15, No. 3, Mar. 2005.
Wedi et al., Intra Only 4:4:4 Coding for H.264/AVC FRExt, JVT of ISO/IEC MPEG & ITU-T VCEG, Document: JVT-P088, 16th Meeting: Poznan, PL, Jul. 24-29, 2005.
Sullivan, G., "The H.264/MPEG-4 Advanced Video Coding (AVC) Standard", ITU-T VICA Workshop, Geneva, Switzerland, Jul. 22, 2005, pp. 1-29.

\* cited by examiner

METHODS AND APPARATUS FOR PARALLEL IMPLEMENTATIONS OF 4:4:4 CODING

CROSS-REFERENCE TO RELATED APPLICATIONS

This application claims the benefit, under 35 U.S.C. §365 of International Application PCT/US2007/000316, filed Jan. 9, 2007 which was published in accordance with PCT Article 21(2) on Jul. 19, 2007 in English and which claims the benefit of U.S. provisional patent application No. 60/757,661 filed Jan. 10, 2006.

FIELD OF THE INVENTION

The present invention relates generally to video encoding and decoding and, more particularly, to methods and apparatus for parallel 4:4:4 video encoding and decoding.

BACKGROUND OF THE INVENTION

In a first prior art approach, an independent block partition and, hence, independent spatial predictors are selected for each color component. For example, the 16×16 block partition with one spatial prediction mode may be selected for the red channel, an 8×8 block partition with four spatial prediction modes may be selected for the green channel, and a 4×4 block partition with sixteen spatial prediction modes may be selected for the blue channel.

Conversely, in a second prior art approach, a common block partition is used for all three channels, which is consistent with a definition of macroblock type in a third prior art approach. In addition, a common set of spatial predictors are used for all three channels. Following the above example, in the case of the second prior art approach, the mode selector might have selected an 8×8 block partition as the macroblock type, and each channel would use exactly the same four spatial prediction modes by minimizing the predefined cost function. Obviously, the common mode approach greatly reduces the decoder complexity compared with the independent mode where three spatial prediction modes instead of a single spatial prediction mode have to be decoded for every coding block. In the meantime, since using a common prediction mode instead of three separate modes reduces the total number of bits to encode the spatial prediction information, the common mode solution results in better overall compression performance compared with the independent mode, especially for the mid and low bitrate range. A typical prior art implementation of the common mode method proceeds by examining each channel in turn (i.e., serially) to determine the best spatial predictors. This is a disadvantage when compared to the implementation of the independent channel method, since in that case the optimum spatial predictor for each channel can be derived in parallel in a straightforward way, thus potentially increasing the speed at which the video data is encoded.

SUMMARY OF THE INVENTION

These and other drawbacks and disadvantages of the prior art are addressed by the present invention, which is directed to methods and apparatus for parallel 4:4:4 video encoding and decoding.

According to an aspect of the present principles, there is provided a video encoder for encoding video signal data for an image block. The video encoder includes an encoder for encoding all color components of the image block by selecting a common block partition and a common spatial prediction mode. The common block partition and the common spatial prediction mode are selected by concurrently evaluating all of the color components in parallel.

According to another aspect of the present principles, there is provided a video encoder for encoding video signal data for an image block. The video encoder includes an encoder for encoding all color components of the image block by selecting a common block partition and a common spatial prediction mode. The common block partition and the common spatial prediction mode are selected using a hybrid serial-parallel approach that serially evaluates spatial prediction modes in a set of spatial prediction modes from which the common spatial prediction mode is selected, and that simultaneously evaluates all of the color components in parallel to accomplish a decision for each of the spatial prediction modes in the set.

According to yet another aspect of the present principles, there is provided a method for encoding video signal data for an image block. The method includes encoding all color components of the image block by selecting a common block partition and a common spatial prediction mode. The common block partition and the common spatial prediction mode are selected by concurrently evaluating all of the color components in parallel.

According to still another aspect of the present principles, there is provided a method for encoding video signal data for an image block. The method includes encoding all color components of the image block by selecting a common block partition and a common spatial prediction mode. The common block partition and the common spatial prediction mode are selected using a hybrid serial-parallel approach that serially evaluates spatial prediction modes in a set of spatial prediction modes from which the common spatial prediction mode is selected, and that simultaneously evaluates all of the color components in parallel to accomplish a decision for each of the spatial prediction modes in the set.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which.

DETAILED DESCRIPTION

The present invention is directed to methods and apparatus for parallel 4:4:4 video encoding. Advantageously, the present invention provides methods and apparatus for selecting an optimum spatial prediction mode for intra coded pictures using all three color channels simultaneously when the common block partition and spatial prediction encoding method is employed.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

Figure 1:
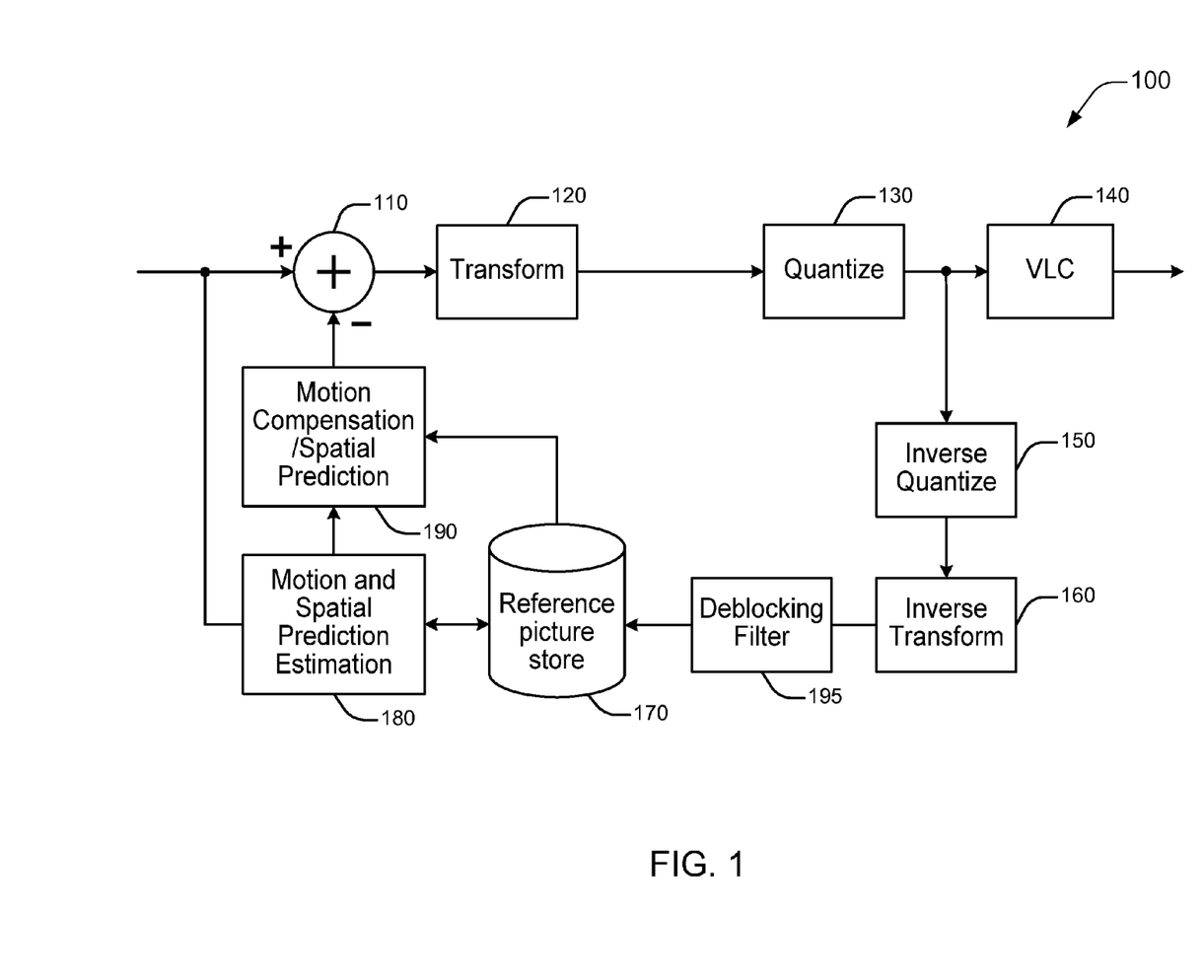
FIG. 1 is a block diagram for an exemplary video encoder to which the present principles may be applied, in accordance with an embodiment of the present principles.

Turning to FIG. 1, an exemplary video encoder is indicated generally by the reference numeral 100. A non-inverting input of a combiner 110 and a first input of a motion and spatial prediction estimator 180 are available as inputs of the encoder 100.

An output of the combiner 110 is connected in signal communication with an input of a transformer 120. An output of the transformer 120 is connected in signal communication with an input of a quantizer 130. An output of the quantizer 130 is connected in signal communication with an input of variable length coder (VLC) 140. An output of the variable length coder 140 is available as an output of the video encoder 100.

The output of the quantizer 130 is further connected in signal communication with an input of an inverse quantizer 150. An output of the inverse quantizer 150 is connected in signal communication with an input of an inverse transformer 160. An output of the inverse transformer 160 is connected in signal communication with an input of a deblocking filter 195. The output of the deblocking filter 195 is connected in signal communication with an input of a reference picture store 170. A bi-directional input/output of the reference picture store 170 is connected in signal communication with a second input of the motion and spatial prediction estimator 180. An output of the motion and spatial prediction estimator 180 is connected in signal communication with a first input of a motion compensator and spatial predictor 190. An output of the reference picture store 170 is connected in signal communication with a second input of the motion compensator and spatial predictor 190. The output of the motion compensator and spatial predictor 190 is connected in signal communication with an inverting input of the combiner 110.

Figure 2:
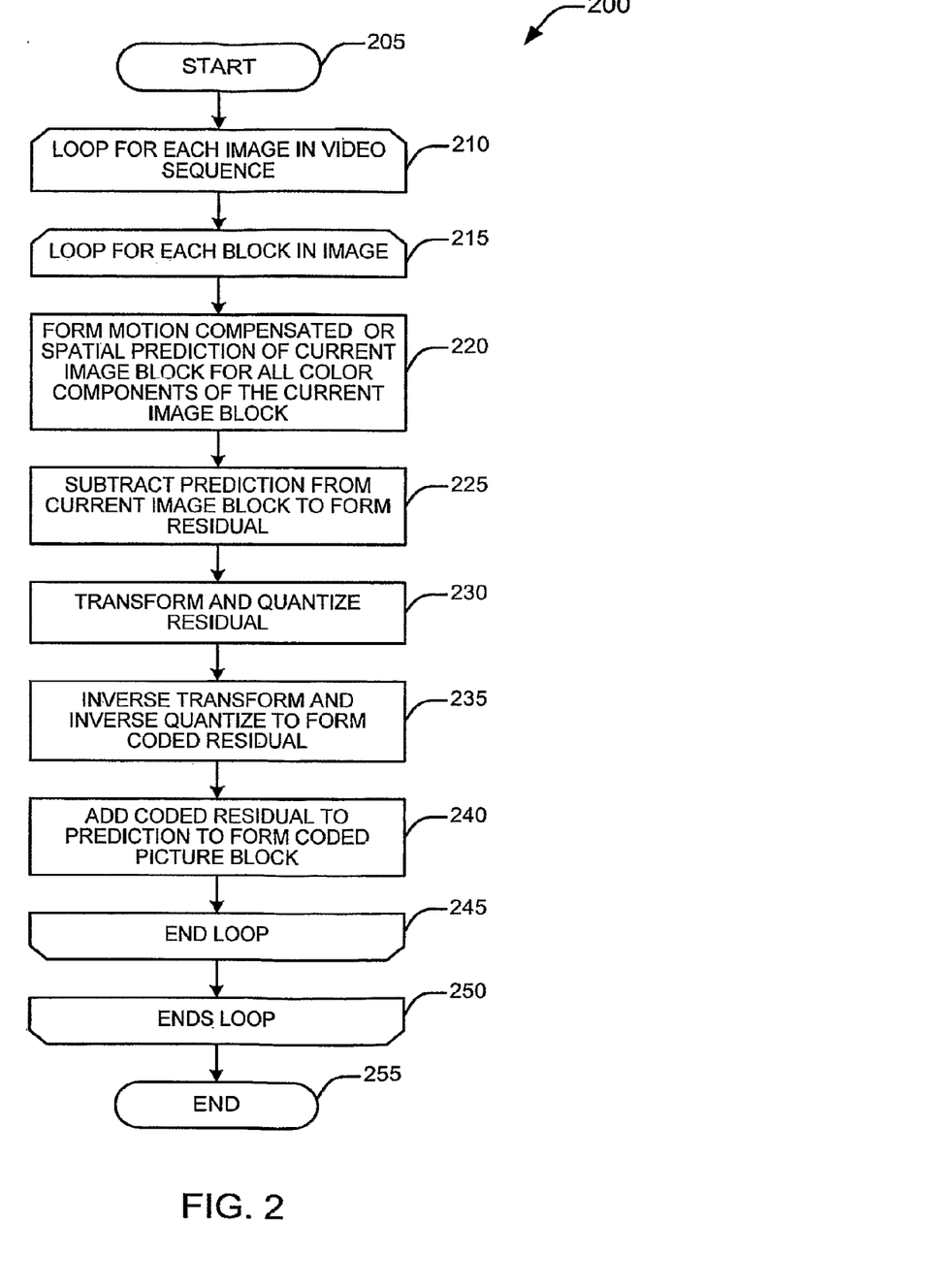
FIG. 2 is a flow diagram for an exemplary method for 4:4:4 video coding by encoding all three color channels, in accordance with an embodiment of the present principles.

Turning to FIG. 2, an exemplary method for 4:4:4 video coding by encoding all three color channels is indicated generally by the reference numeral 200. The method 200 includes a start block 205 that passes control to a loop limit block 210. The loop limit block 210 performs a loop for each image in the sequence, where all three color components (red, green, and blue) are considered, and passes control to a loop limit block 215. The loop limit block 215 performs a loop for each block in an image, and passes control to a function block 220. The function block 220 forms a motion compensated or spatial prediction of the current image block for all color components, and passes control to a function block 225. The function block 225 subtracts the motion compensated or spatial prediction from the current image block to form a prediction residual, and passes control to a function block 230. The function block 230 transforms and quantizes the prediction residual, and passes control to a function block 235. The function block 235 inverse transforms and quantizes the prediction residual to form a coded prediction residual, and passes control to a function block 240. The function block 240 adds the coded residual to the prediction to form a coded picture block, and passes control to a loop limit block 245. The end loop block 245 ends the loop over each block in the image and passes control to a loop limit block 250. The loop limit block 250 ends loops over each image in the sequence, and passes control to an end block 255.

Figure 3:
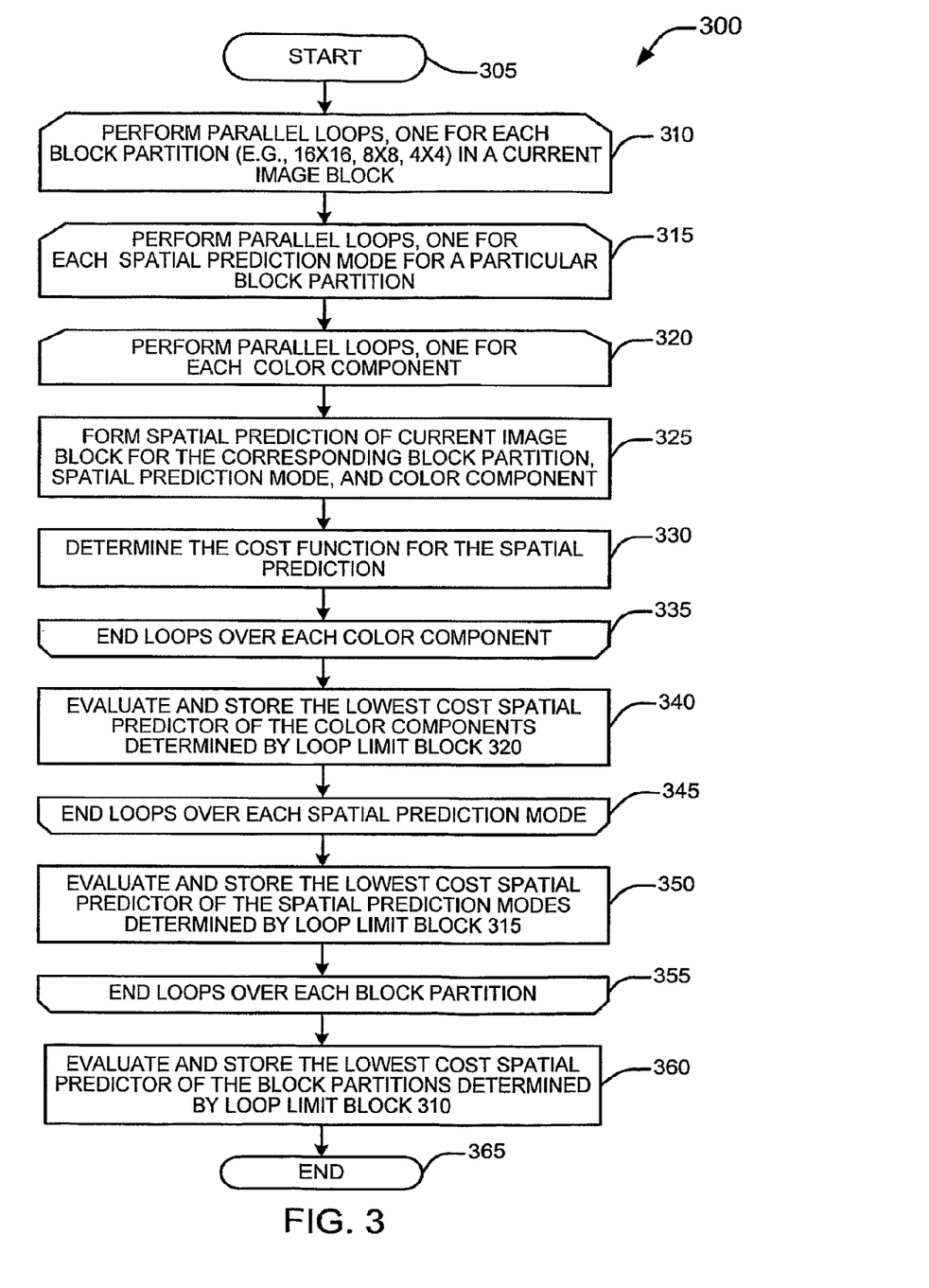
FIG. 3 is a flow diagram for an exemplary method for determining the optimum spatial predictor for all three color channels in parallel as per function block 220 of FIG. 2, in accordance with an embodiment of the present principles.

Turning to FIG. 3, an exemplary method for determining the optimum spatial predictor for all three color channels in parallel as per function block 220 of FIG. 2 is indicated generally by the reference numeral 300. The method 300 includes a start block 305 that passes control to a loop limit block 310. The loop limit block 310 performs a loop, for each block partition (thus, performing three loops, one for 16×16 partitions, one for 8×8 partitions, and one for 4×4 partitions), in a block and passes control to a loop limit block 315. The loop limit block 315 performs a loop, for each spatial mode for a particular block partition (the number of loops depends on the block partition) and passes control to a loop limit block 320. The loop limit block 320 performs a loop for each color component in an image (thus, performing three parallel loops, one for red, one for green, and one for blue), and passes control to a function block 325. The function block 325 forms a spatial prediction of the current image block for the corresponding block partition, spatial prediction mode, and color component (based on which loop from loop limit blocks 310, 315, and 320), and passes control to a function block 330. The function block 330 determines the cost function for the spatial prediction, and passes control to loop limit block 335. The loop limit block 335 ends the parallel loops over each color component in the image, and passes control to block 340. The function block 340 evaluates and stores the lowest cost spatial predictor of the color components determined by loop limit block 320, and passes control to an end loop block 345. The end loop block 345 ends the loop over each spatial prediction mode and passes control to a function block 350. The function block 350 evaluates and stores the lowest cost spatial predictor of the spatial predictor modes determined by loop limit block 315, and passes control to an end loop block 355. The end loop block 355 ends the loop over each block partition determined by loop limit block 310 and passes control to a function block 360. The function block 360 evaluates and stores the lowest cost spatial predictor of the block partitions determined by loop limit block 310, and passes control to an end block 365.

The present principles are directed to a method and apparatus for parallel implementation of the Advanced 4:4:4 Profile for the International Organization for Standardization/international Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 recommendation (hereinafter the "MPEG-4 AVC standard").

In the common prediction mode method of the above-referenced second prior art approach, each channel uses the same block partition and the same spatial prediction modes. A comparison is described herein between the common prediction mode method of the above-referenced second prior art approach and the independent mode selection method of the first prior art approach, the latter where each channel may have independent block partitions and independent spatial prediction modes. It is shown herein in accordance with an embodiment of the present principles that for the case of maximum parallelism, only one additional comparison is performed for the common mode case as compared to the independent mode case. It is also shown herein, with respect to a case of a hybrid serial/parallel solution where the channels are encoded in parallel but the processes themselves are serial, that the common-mode method requires no more memory or space than the independent mode method.

In this analysis of parallelism we note that there are many possible implementation schemes and we will only be discussing a subset of the possible solutions. However, given the teachings of the present principles provided herein, one of ordinary skill in this and related arts will contemplate these and various other parallel implementation schemes in accordance with the present principles, while maintaining the scope of the present principles.

An embodiment will now be described regarding the parallel analysis of independent mode selection with respect to FIGS. 4 and 5.

Figure 4:
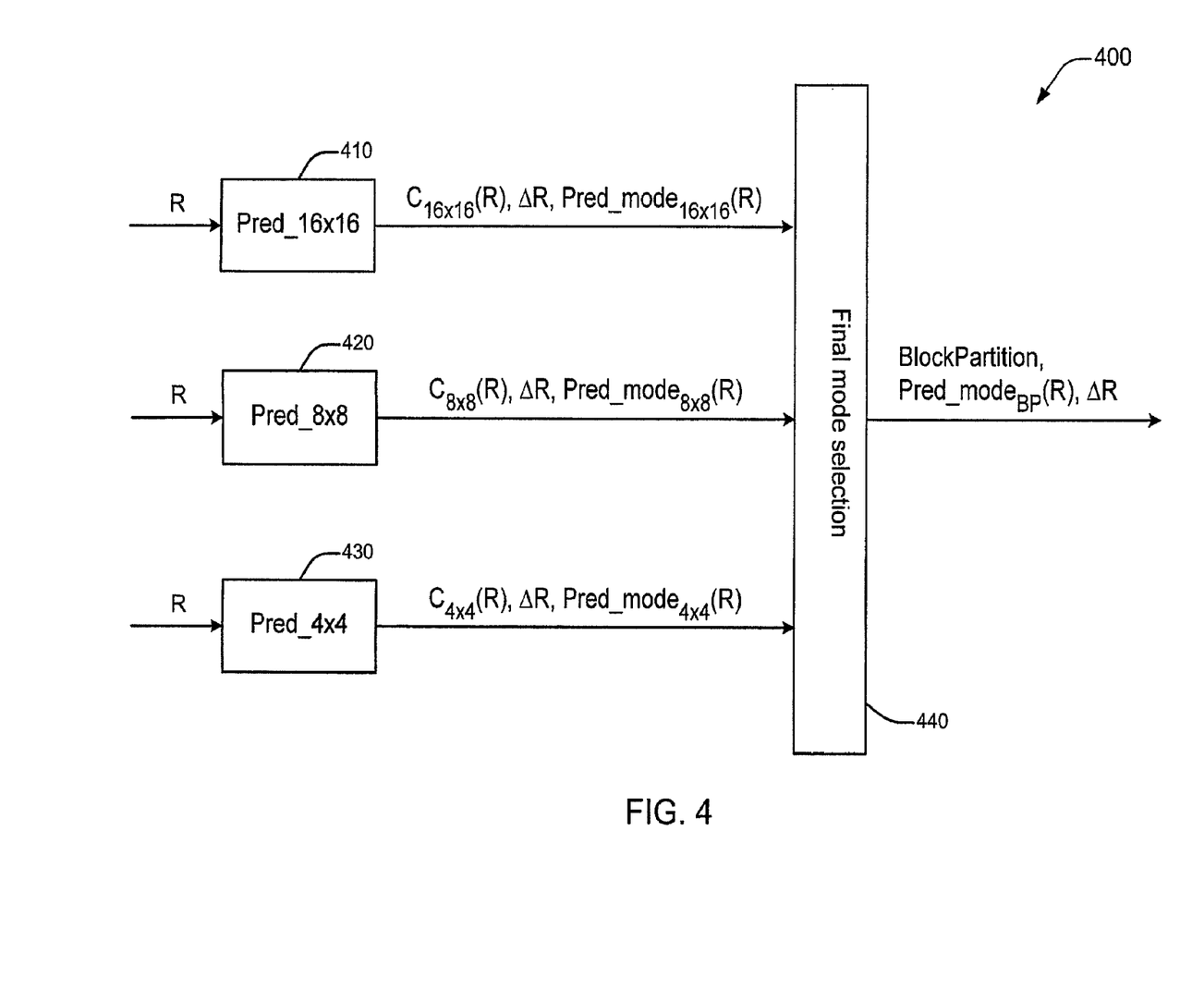
FIG. 4 is a block diagram for a spatial predictor selection apparatus with independent block partition for the red color component.

Turning to FIG. 4, a spatial predictor selection apparatus with independent block partition for the red color component (also referred to as the red channel or the R channel) is indicated generally by the reference numeral 400. The apparatus 400 includes a Pred_16×16 processing unit 410, a Pred_8×8 processing unit 420, a Pred_4×4 processing unit 430, and a final mode selection unit 440. The three processing units Pred_16×16 410, Pred_8×8 420, and Pred_4×4 430 select the best prediction mode(s) from the 16×16, 8×8, and 4×4 block partitions respectively. The output of the processing units is a cost function $C_i$, best prediction residue $\Delta R_i$, and the set of the best prediction modes as determined by the cost function, Pred_mode$_i$, where i is in the set {16×16, 8×8, 4×4}. By selecting the smallest cost function among the three values, the final mode selection unit 440 selects the final BlockPartition and Pred_mode$_{BlockPartition}$ for each of the 16×16 blocks of the red channel.

Figure 5:
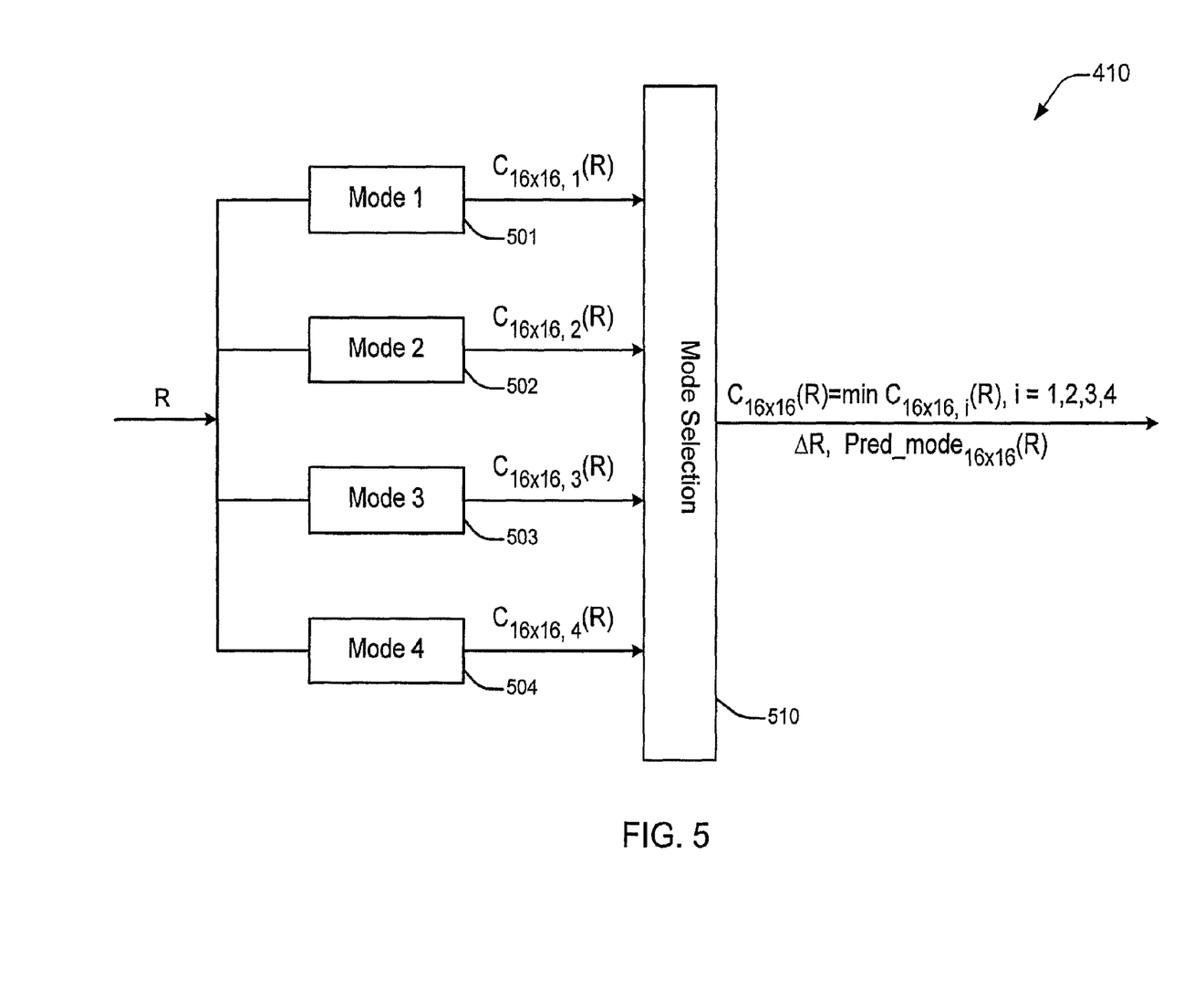
FIG. 5 is a block diagram further illustrating the Pred_16× 16 processing unit shown in FIG. 4.

Turning to FIG. 5, the Pred_16×16 processing unit 410 of FIG. 4 is further shown. The Pred_16×16 processing unit 410 includes mode processing units 501-504 for modes 1-4, respectively, and a mode selection unit 510. Each of the modes is examined by the mode processing units in parallel to determine the cost function $C_{16\times16,j}(R)$, where j indicates the mode number. The best mode is then selected by the mode selection unit 510 using the minimization function and the Pred_mode$_i$ and $\Delta R$ are output there from.

In the case of Pred_8×8 processing units there are 4 mode processing units and 9 prediction modes for a total of 36 possible cost functions and associated residuals. In the case of Pred_4×4, there are 16 mode processing units and 9 possible modes for a total of 144 possible cost functions and residuals. Thus, in total, there are 184 independent mode processing units required before the cost function selection.

This same scheme as described in FIG. 4 and FIG. 5 can also be implemented for the G and B channels in a completely independent manner and, thus, can be parallelized for all three channels. Thus, there are a total of 552 independent processing units required for complete parallelism.

Figure 6:
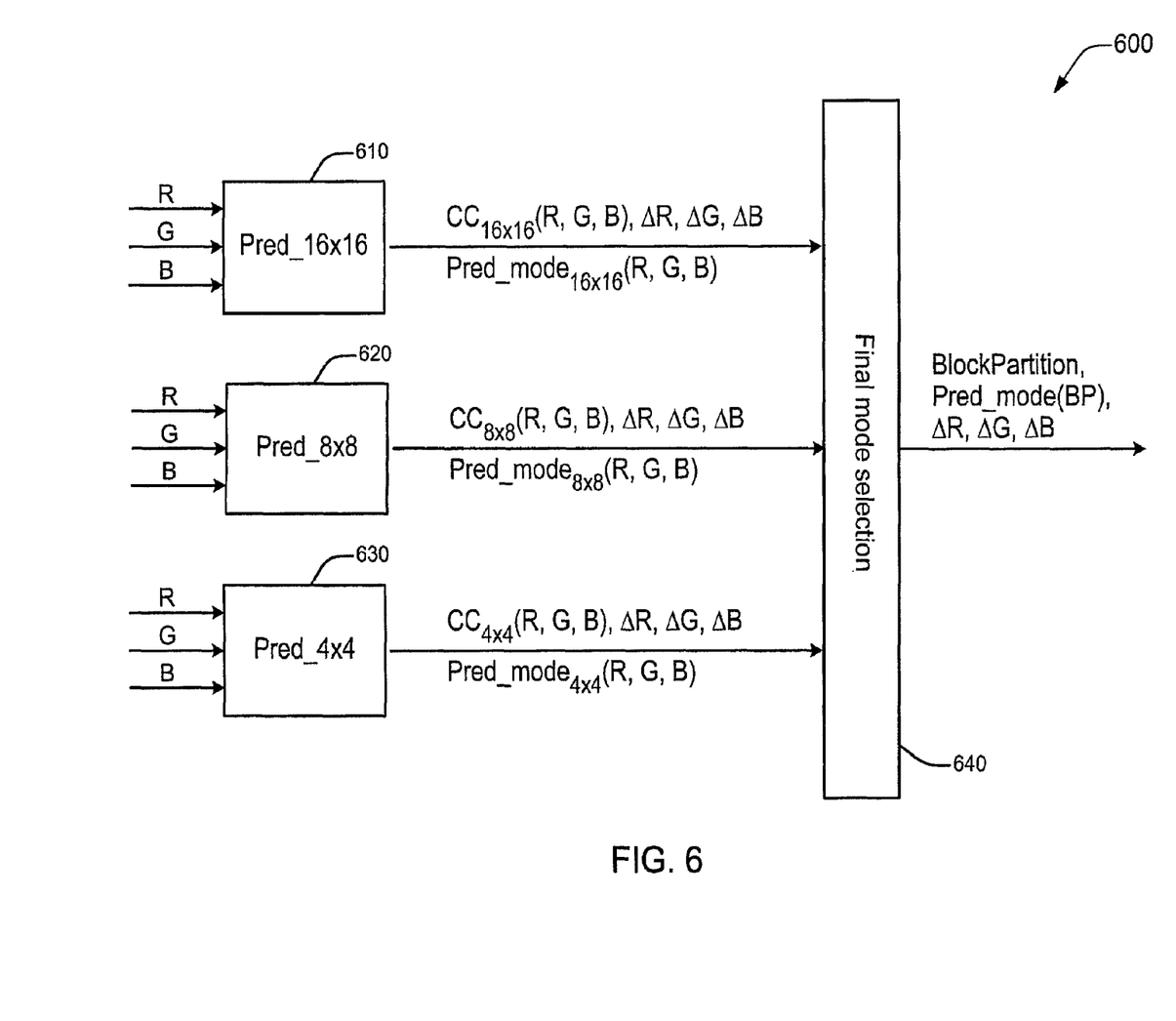
FIG. 6 is a block diagram for a spatial predictor selection apparatus with common block partition for the red, green, and blue color components.

An embodiment will now be described regarding the parallel analysis of common-mode selection with respect to FIGS. 6 and 7. Turning to FIG. 6, a spatial predictor selection apparatus with common block partition for the red, green, and blue color components is indicated generally by the reference numeral 600. The apparatus 600 includes a Pred_16×16 processing unit 610, a Pred_8×8 processing unit 620, a Pred_4×4 processing unit 630, and final mode selection unit 640. The apparatus 600 is similar to apparatus 400 shown in FIG. 4, except the inputs are now all three channels. The cost function CC and Pred_mode are also now a function of all three channels rather than a single channel. However, the parallelism inherent in this stage is exactly as that shown in FIG. 4.

Figure 7:
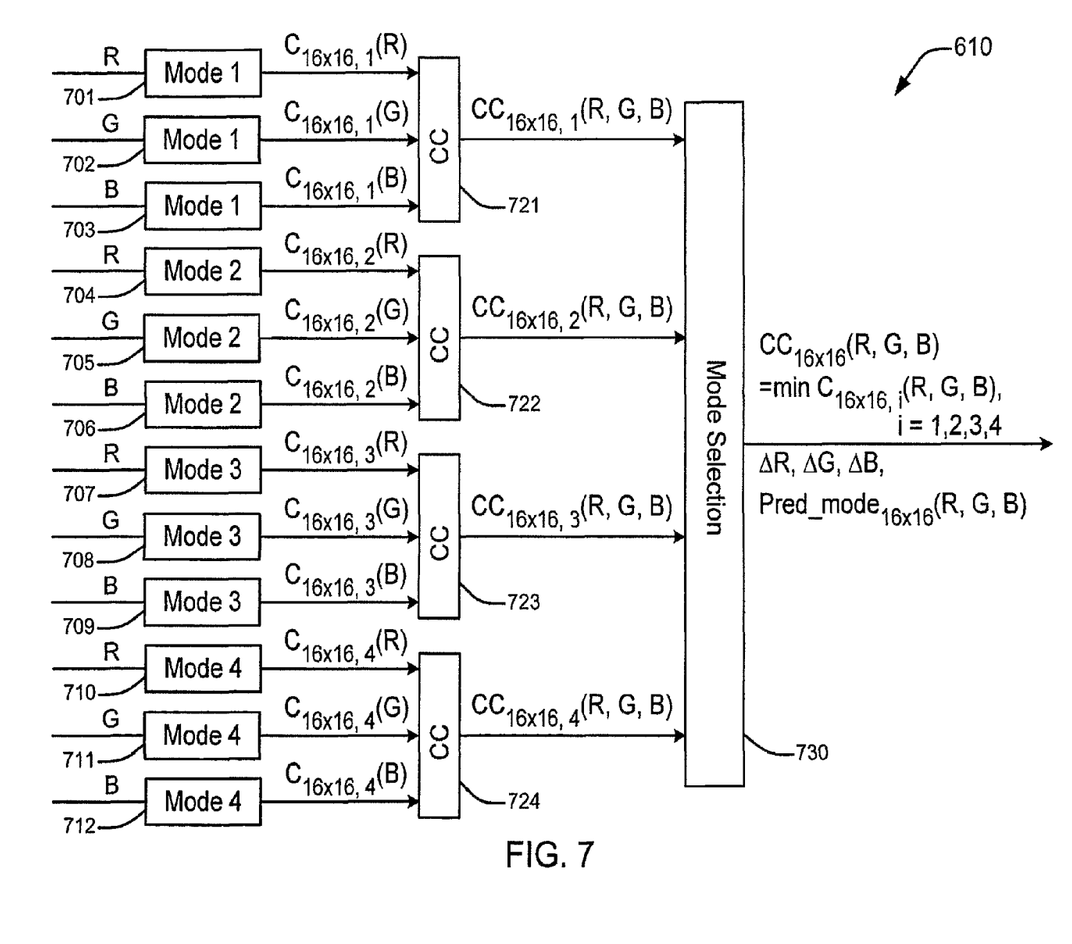
FIG. 7 is a block diagram for a spatial predictor selection apparatus with a common block partition 16×16.

Turning to FIG. 7, the Pred_16×16 processing unit 610 of FIG. 6 is further shown. The Pred_16×16 processing unit 610 includes mode processing units 701-712, the RGB cost functions CC 721-724, and mode selection unit 730. In this case, there are three processing units for each mode. Compared to FIG. 4, there is an additional decision block to choose the best mode which is common to all three colors. In this case there are 12 mode processing units which may operate in parallel. Similarly, for the Pred_8×8 case there are 108 mode processing units and for the Pred_4×4 case there are 432 mode processing units. In total, this is the same number of parallel mode processing units as specified above for the independent mode selection case. The main difference is that there is one more decision layer required to determine the best common mode cost function among the three channels.

An embodiment will now be described regarding serial parallel hybrids with respect to FIGS. 8, 9, and 10.

Herein above, an example implementation for maximum parallelism is described, i.e., a case where the minimum number of cascaded elements (and, thus, the minimum time) are required. However, due to memory or space limitations, it may not be possible to completely parallelize the solution. Here, we examine the case for the independent mode selection where we allow a serial solution within channels, but the minimum amount of parallelism required is that all three channels are to be processed simultaneously. This case is shown in FIG. 8 for the Pred_mode$_{16×16}$ case, wherein only the R channel is shown for the sake of illustration and brevity. The G and B channels are simply replicated versions of the R channel. In a serial manner, one can iterate from mode 1 through mode 4, at each step evaluating the cost function and then storing a copy of the current best cost, prediction modes, and residuals. At the end the best cost, prediction modes, and residuals are available to be compared to the other block partitions, and only one copy of these values is required to be stored. As was true of the completely parallel solution, no communication is required between the channels. Since three channels are independent we require storing only one copy for each channel simultaneously, for a total of three copies.

Figure 8:
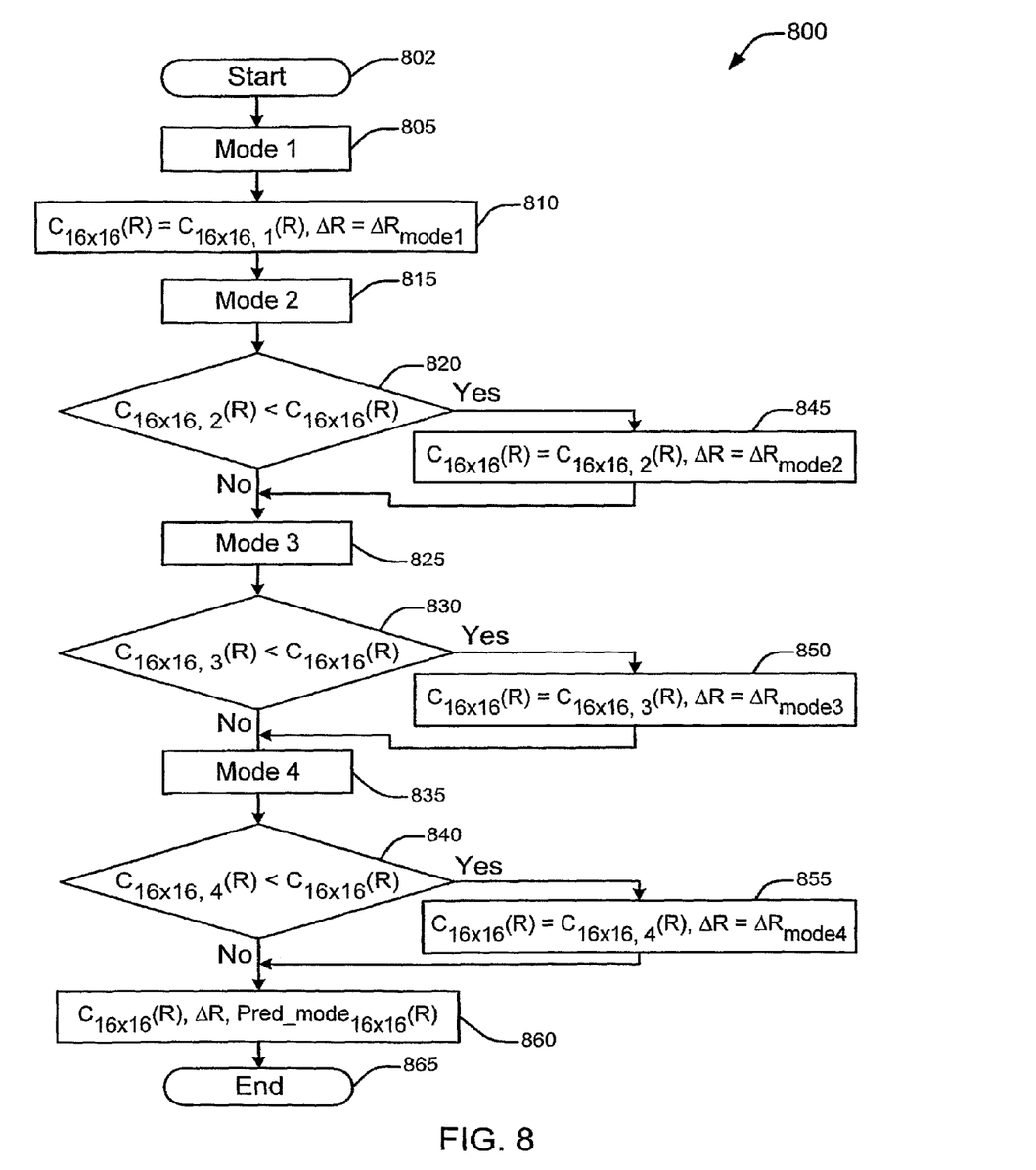
FIG. 8 is a block diagram for a method for serially selecting independent prediction modes for each color component of a video sequence to be encoded.

Turning to FIG. 8, a serial method for implementing an independent mode for the red channel is indicated generally by the reference numeral 800. It is to be appreciated that the green and blue channels are implemented similarly. Thus, given the teachings of the present principles provided herein, one of ordinary skill in this and related arts will readily implement a similar serial method for implementing an independent mode for the green and blue channels, while maintaining the scope of the present principles.

The method 800 includes a start block 802 that passes control to a function block 805. The function block 805 processes mode 1, and passes control to a function block 810. The function block 810 outputs $C_{16×16}(R)=C_{16×16, 1}(R)$, $\Delta R=\Delta R_{mode\ 1}$, and passes control to a function block 815. The function block 815 processes mode 2, and passes control to a decision block 820. The decision block 820 determines whether or not $C_{16×16, 2}(R)<C_{16×6}(R)$. If so, then control is passed to a function block 825. Otherwise, control is passed to a function block 845. The function block 825 processes mode 3, and passes control to a decision block 830. The decision block 830 determines whether or not $C_{16×16, 3}(R)<C_{16×16}(R)$. If so, then control is passed to a function block 835. Otherwise, control is passed to a function block 850.

The function block 835 processes mode 4, and passes control to a decision block 840. The decision block 840 determines whether or not $C_{16×16, 4}(R)<C_{16×16}(R)$. If so, then control is passed to a function block 860. Otherwise, control is passed to a function block 855. The function block 860 outputs $C_{16×16}(R)$, $\Delta R$, Pred_mode$_{16×16}(R)$, and passes control to an end block 865.

The function block 845 outputs $C_{16×16}(R)=C_{16×16, 2}(R)$, $\Delta R=\Delta R_{mode2}$, and passes control to the function block 825.

The function block 850 outputs $C_{16×16}(R)=C_{16×16, 3}(R)$, $\Delta R=\Delta R_{mode3}$, and passes control to the function block 835.

The function block 855 outputs $C_{16×16}(R)=C_{16×16, 4}(R)$, $\Delta R=\Delta R_{mode4}$, and passes control to the function block 860.

Figure 9:
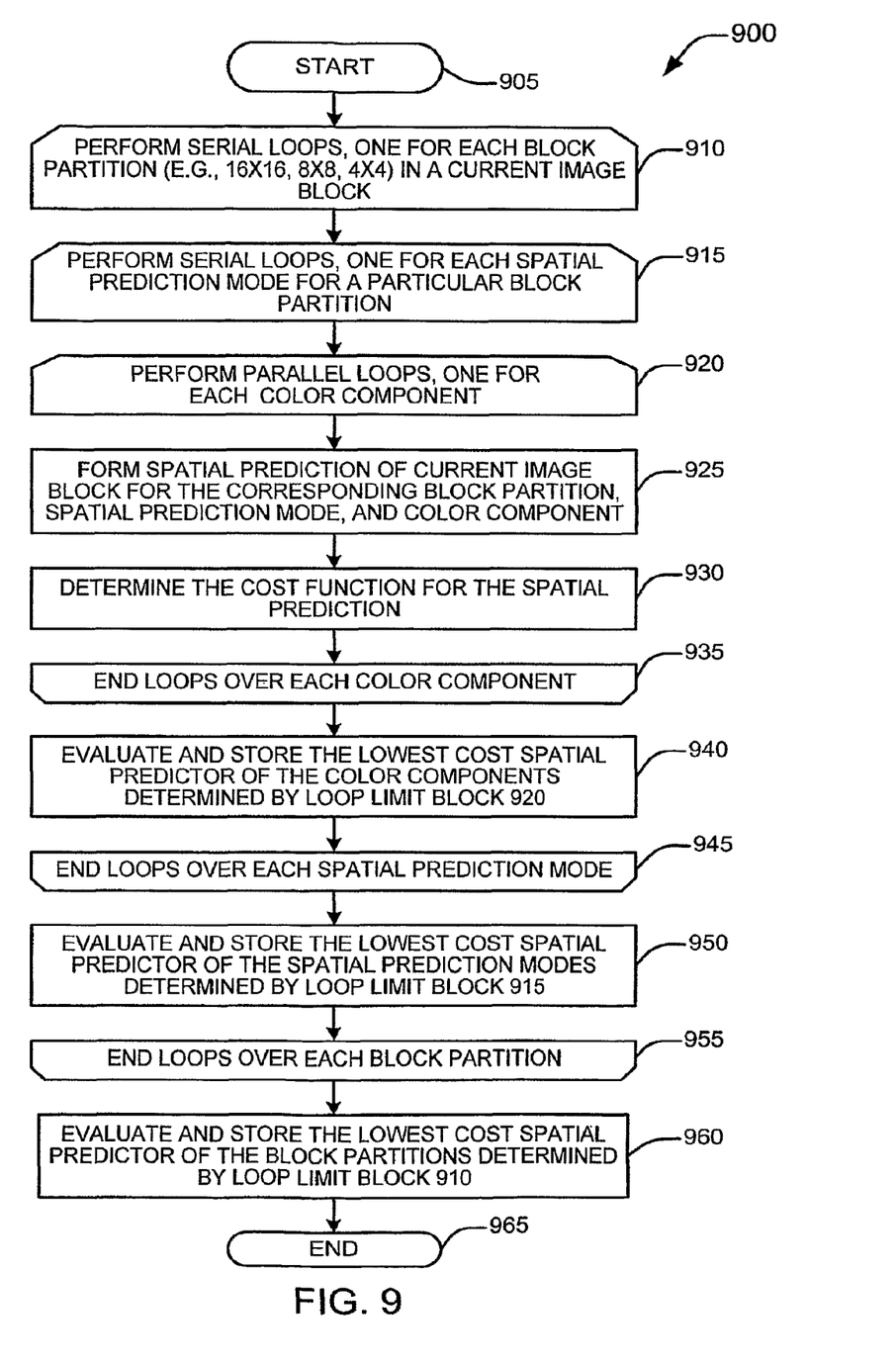
FIG. 9 is a flow diagram for an exemplary method for 4:4:4 video spatial prediction coding by determining the optimum predictor for all three color channels, in accordance with an embodiment of the present principles where only the color channels are computed in parallel.

Turning to FIG. 9, an exemplary method for determining the optimum spatial predictor for all three color channels in a hybrid serial-parallel fashion as per function block 220 of FIG. 2 is indicated generally by the reference numeral 900. The method 900 includes a start block 905 that passes control to a loop limit block 910. The loop limit block 910 performs a loop in sequence, for each block partition (thus, performing three loops, one for 16×16 partitions, one for 8×8 partitions, and one for 4×4 partitions), in a block and passes control to a loop limit block 915. The loop limit block 915 performs a loop in sequence, for each spatial mode for a particular block partition (the number of loops depends on the block partition) and passes control to a loop limit block 920. The loop limit block 9020 performs a loop for each color component in an image (thus, performing three parallel loops, one for red, one for green, and one for blue), and passes control to a function block 925. The function block 925 forms a spatial prediction of the current image block for the corresponding block partition, spatial prediction mode, and color component (based on which loop from loop limit blocks 910, 915, and 920), and passes control to a function block 930. The function block 930 determines the cost function for the spatial prediction, and passes control to loop limit block 935. The loop limit block 935 ends the parallel loops over each color component in the image, and passes control to block 940. The function block 940 evaluates and stores the lowest cost spatial predictor of the color components determined by loop limit block 920, and passes control to an end loop block 945. The end loop block 945 ends the loop over each spatial prediction mode and passes control to a function block 950. The function block 950 evaluates and stores the lowest cost spatial predictor of the spatial predictor modes determined by loop limit block 915, and passes control to an end loop block 955. The end loop block 1055 ends the loop over each block partition determined by loop limit block 910 and passes control to a function block 960. The function block 960 evaluates and stores the lowest cost spatial predictor of the block partitions determined by loop limit block 910, and passes control to an end block 965.

The only restriction here as compared to the case corresponding to FIG. 8 is that we proceed in a synchronous manner for all three channels when examining the cost for each prediction mode. Thus, in this case, the red, green, and blue channels are evaluated and all three sets of costs, prediction modes, and residuals are stored. A cost function that is a function of all three costs is evaluated; this step is an additional one when compared to the independent mode case in the previous paragraph. Second, all three channels are evaluated for the next mode. If the combined cost function is better for the next mode, then all three channels' prediction modes and residuals are stored. This continues for the total number of modes required (4 in the 16×16 case). Thus, even for a serial implementation of the common mode case, there is no additional storage required when compared to the serial independent mode implementation when the channels are to be implemented in parallel.

Figure 10A:
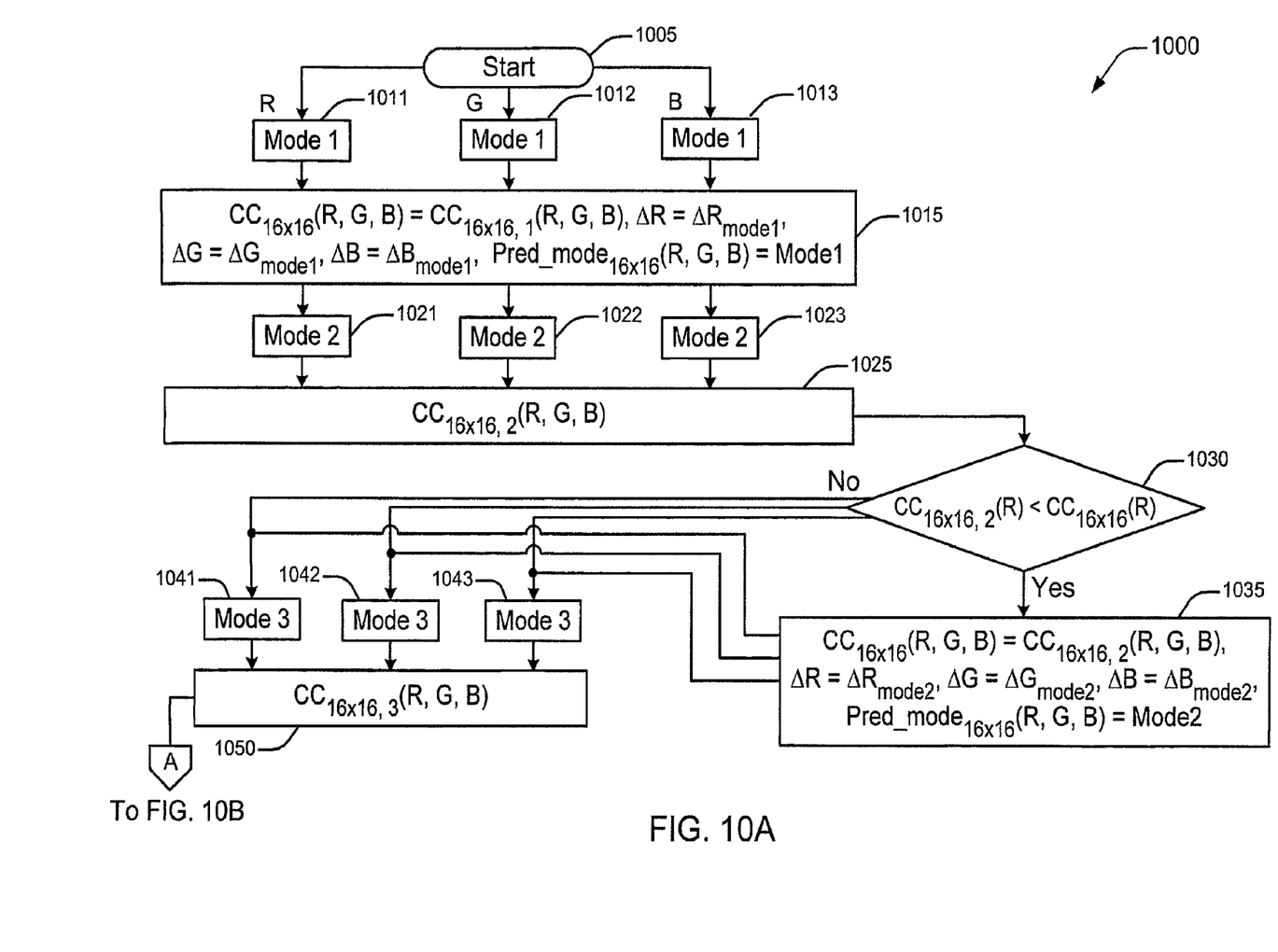
FIG. 10 is a block diagram for a hybrid method for selecting a common prediction mode for each color component of a video sequence to be encoded.
Figure 10B:
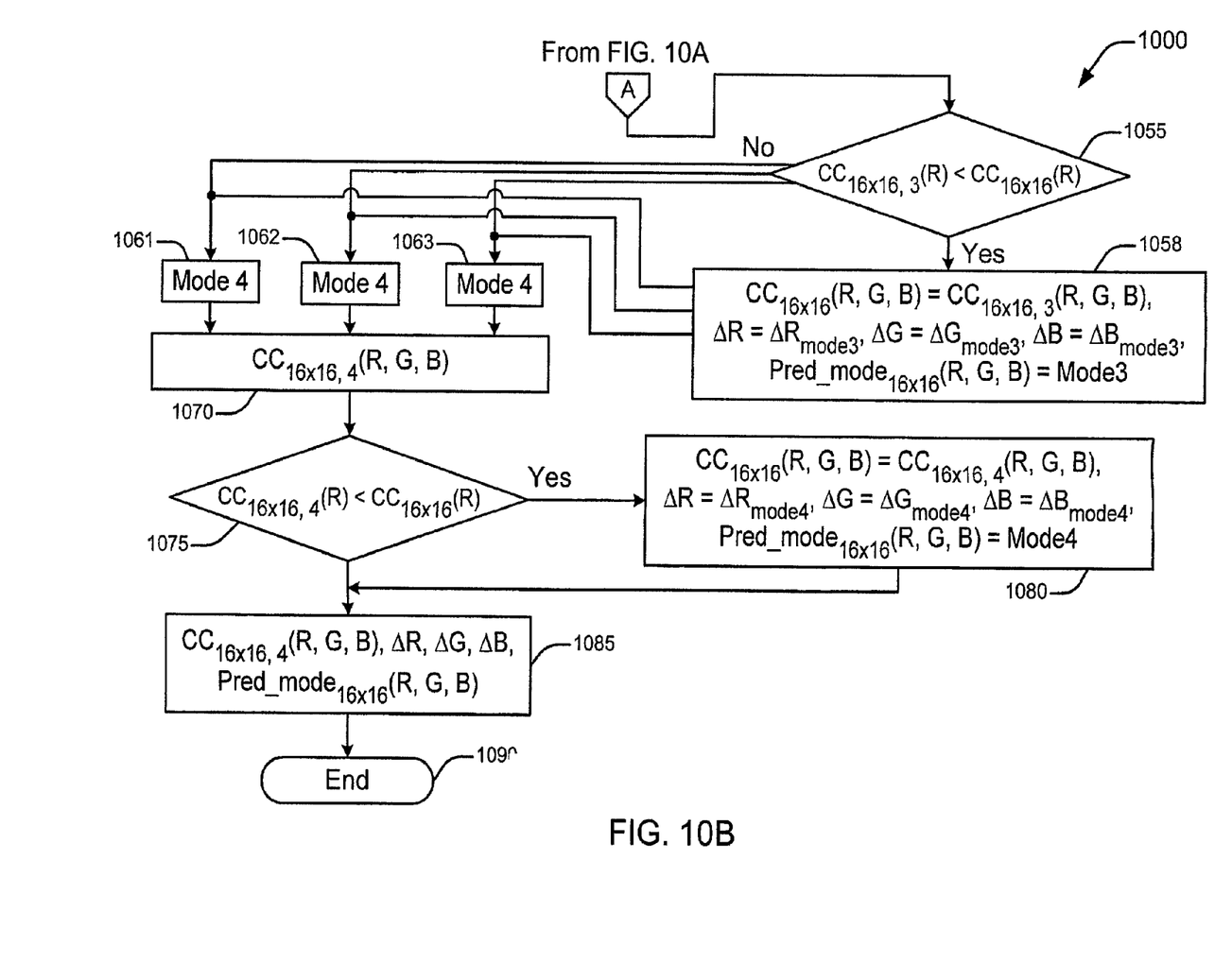

Turning to FIG. 10, a hybrid method for implementing a common mode for the color channels is indicated generally by the reference numeral 1000.

The method 1000 includes a start block 1005 that passes to a function block 1011, a function block 1012, and a function block 1013. The function block 1011 processes mode 1 for the red color channel, and passes control to a function block 1015. The function block 1012 processes mode 1 for the green color channel, and passes control to the function block 1015. The function block 1013 processes mode 1 for the blue color channel, and passes control to the function block 1015. The function block 1015 outputs $CC_{16\times16}(R, G, B)=CC_{16\times16, 1}(R, G, B)$, $\Delta R=\Delta R_{mode1}$, $\Delta G=\Delta G_{mode1}$, $\Delta B=\Delta B_{mode1}$, $Pred\_mode_{16\times16}(R, G, B)=Mode1$, and passes control to a function block 1021, a function block 1022, and a function block 1023. The function block 1021 processes mode 2 for the red color channel, and passes control to a function block 1025. The function block 1022 processes mode 2 for the green color channel, and passes control to the function block 1025. The function block 1023 processes mode 2 for the blue color channel, and passes control to the function block 1025.

The function block 1025 outputs $CC_{16\times16, 2}(R, G, B)$, and passes control to a decision block 1030.

The decision block 1030 determines whether or not $CC_{16\times16, 2} < CC_{16\times16}$. If so, then control is passed to a function block 1035. Otherwise, control is passed to a function block 1041, a function block 1042, and a function block 1043.

The function block 1035 outputs $CC_{16\times16}(R, G, B)=CC_{16\times16, 2}(R, G, B)$, $\Delta R=\Delta R_{mode2}$, $\Delta G=\Delta G_{mode2}$, $\Delta B=\Delta B_{mode2}$, $Pred\_mode_{16\times16}(R, G, B)=Mode2$, and passes control to the function blocks 1041, 1042, and 1043.

The function block 1041 processes mode 3 for the red color channel, and passes control to the function block 1050. The function block 1042 processes mode 3 for the green color channel, and passes control to the function block 1050. The function block 1043 processes mode 3 for the blue color channel, and passes control to the function block 1050.

The function block 1050 outputs $CC_{16\times16, 3}(R, G, B)$, and passes control to a decision block 1055.

The decision block 1055 determines whether or not $CC_{16\times16, 3} < CC_{16\times16}$. If so, then control is passed to a function block 1058. Otherwise, control is passed to a function block 1061, a function block 1062, and a function block 1063.

The function block 1058 outputs $CC_{16\times16}(R, G, B)=CC_{16\times16, 3}(R, G, B)$, $\Delta R=\Delta R_{mode3}$, $\Delta G=\Delta G_{mode3}$, $\Delta B=\Delta B_{mode3}$, $Pred\_mode_{16\times16}(R, G, B)=Mode3$, and passes control to the function blocks 1061, 1062, and 1063.

The function block 1061 processes mode 4 for the red color channel, and passes control to a function block 1070. The function block 1062 processes mode 4 for the green color channel, and passes control to the function block 1070. The function block 1063 processes mode 4 for the blue color channel, and passes control to the function block 1070.

The function block 1070 outputs $CC_{16\times16, 4}(R, G, B)$, and passes control to a decision block 1075. The decision block 1075 determines whether or not $CC_{16\times16, 4} < CC_{16\times16}$. If so, then control is passed to a function block 1080. Otherwise, control is passed to a function block 1085.

The function block 1080 outputs $CC_{16\times16}(R, G, B)=CC_{16\times16, 4}(R, G, B)$, $\Delta R=\Delta R_{mode4}$, $\Delta G=\Delta G_{mode4}$, $\Delta B=\Delta B_{mode4}$, $Pred\_mode_{16\times16}(R, G, B)=Mode4$, and passes control to the function block 1085.

The function block 1085 outputs $CC_{16\times16}(R, G, B)$, $\Delta R$, $\Delta G$, $\Delta B$, $Pred\_mode_{16\times16}(R, G, B)$, and passes control to the end block 1090.

We note that the 8×8 and 4×4 cases may be evaluated in a similar manner. The result does not change if the 8×8 and 4×4 cases are evaluated in parallel or serially, as long as the same degree of parallelism is available in the independent mode and common mode cases.

Thus, as shown herein, contrary perhaps to initial intuition, the common mode selection method can be parallelized, in the sense of processing all three channels simultaneously, to the same degree that an independent mode selection method can in the proposed Advanced 4:4:4 Profile of the MPEG-4 AVC standard.

A description will now be given of some of the many attendant advantages/features of the present invention, some of which have been mentioned above. For example, one advantage/feature is a video encoder for encoding video signal data for an image block, the video encoder including an encoder for encoding all color components of the image block by selecting a common block partition and a common spatial prediction mode. The common block partition and the common spatial prediction mode are selected by concurrently evaluating all of the color components in parallel. Another advantage/feature is the video encoder as described above, wherein the common block partition is a sub-macroblock partition. Moreover, another advantage/feature is the video encoder as described above, wherein the encoder uses a lowest cost function to select the common spatial prediction mode. Further, another advantage/feature is the video encoder as described above, wherein the encoder selects the common block partition from among a set of different block partitions, and evaluates the different block partitions in parallel for each of the color components. Also, another advantage/feature is the video encoder that selects the common block partition from among a set of different block partitions and evaluates the different block partitions in parallel for each of the color components as described above, wherein the encoder selects the common spatial prediction mode from among a set of different spatial prediction modes, and evaluates the different spatial prediction modes in parallel for each of the different block partitions.

Additionally, another advantage/feature is a video encoder for encoding video signal data for an image block, the video encoder including an encoder for encoding all color components of the image block by selecting a common block partition and a common spatial prediction mode. The common block partition and the common spatial prediction mode are selected using a hybrid serial-parallel approach that serially evaluates spatial prediction modes in a set of spatial prediction modes from which the common spatial prediction mode is selected, and that simultaneously evaluates all of the color components in parallel to accomplish a decision for each of the spatial prediction modes in the set. Another advantage/feature is the video encoder as described above, wherein the common block partition is a sub-macroblock partition. Moreover, another advantage/feature is the video encoder as described above, wherein the encoder uses a lowest cost function to select the common spatial prediction mode. Further, another advantage/feature is the video encoder as described above, wherein the encoder selects the common spatial prediction mode from among a set of different spatial prediction modes, and serially evaluates the different spatial prediction modes for each of the different block partitions. Also, another advantage/feature is the video encoder as described above, wherein the encoder selects the common block partition from among a set of different block partitions, and evaluates the different block partitions in parallel for each of the color components. Additionally, another advantage/feature is the video encoder as described above, wherein the encoder selects the common block partition from among a set of different block partitions, and serially evaluates the different block partitions for each of the color components.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

The invention claimed is:

1. An apparatus for encoding video signal data for an image block, comprising:
  an encoder for encoding all color components of the image block by selecting a common block partition and a common spatial prediction mode, wherein the common block partition and the common spatial prediction mode are selected by concurrently evaluating all of the color components in parallel.

2. The apparatus of claim 1, wherein the common block partition is a sub-macroblock partition.

3. The apparatus of claim 1, wherein said encoder uses a lowest cost function to select the common spatial prediction mode.

4. The apparatus of claim 1, wherein said encoder selects the common block partition from among a set of different block partitions, and evaluates the different block partitions in parallel for each of the color components.

5. The apparatus of claim 4, wherein said encoder selects the common spatial prediction mode from among a set of different spatial prediction modes, and evaluates the different spatial prediction modes in parallel for each of the different block partitions.

6. An apparatus for encoding video signal data for an image block, comprising:
  an encoder for encoding all color components of the image block by selecting a common block partition and a common spatial prediction mode, wherein the common block partition and the common spatial prediction mode are selected using a hybrid serial-parallel approach that serially evaluates spatial prediction modes in a set of spatial prediction modes from which the common spatial prediction mode is selected, and that simultaneously evaluates all of the color components in parallel to accomplish a decision for each of the spatial prediction modes in the set.

7. The apparatus of claim 6, wherein the common block partition is a sub-macroblock partition.

8. The apparatus of claim 6, wherein said encoder uses a lowest cost function to select the common spatial prediction mode.

9. The apparatus of claim 6, wherein said encoder selects the common spatial prediction mode from among a set of different spatial prediction modes, and serially evaluates the different spatial prediction modes for each of the different block partitions.

10. The apparatus of claim 6, wherein said encoder selects the common block partition from among a set of different block partitions, and evaluates the different block partitions in parallel for each of the color components.

11. The apparatus of claim 6, wherein said encoder selects the common block partition from among a set of different block partitions, and serially evaluates the different block partitions for each of the color components.

12. A method for encoding video signal data for an image block, comprising:
  encoding all color components of the image block by selecting a common block partition and a common spatial prediction mode, wherein the common block partition and the common spatial prediction mode are selected by concurrently evaluating all of the color components in parallel.

13. The method of claim 12, wherein the common block partition is a sub-macroblock partition.

14. The method of claim 12, wherein said encoding uses a lowest cost function to select the common spatial prediction mode.

15. The method of claim 12, wherein said encoding selects the common block partition from among a set of different block partitions, and evaluates the different block partitions in parallel for each of the color components.

16. The method of claim 15, wherein said encoding selects the common spatial prediction mode from among a set of different spatial prediction modes, and evaluates the different spatial prediction modes in parallel for each of the different block partitions.

17. A method for encoding video signal data for an image block, comprising, encoding all color components of the image block by selecting a common block partition and a common spatial prediction mode, wherein the common block partition and the common spatial prediction mode are selected using a hybrid serial-parallel approach that serially evaluates spatial prediction modes in a set of spatial prediction modes from which the common spatial prediction mode is selected, and that simultaneously evaluates all of the color components in parallel to accomplish a decision for each of the spatial prediction modes in the set.

18. The method of claim 17, wherein the common block partition is a sub-macroblock partition.

19. The method of claim 17, wherein said encoding uses a lowest cost function to select the common spatial prediction mode.

20. The method of claim 17, wherein said encoding selects the common spatial prediction mode from among a set of different spatial prediction modes, and serially evaluates the different spatial prediction modes for each of the different block partitions.

21. The method of claim 17, wherein said encoder selects the common block partition from among a set of different block partitions, and evaluates the different block partitions in parallel for each of the color components.

22. The method of claim 17, wherein said encoder selects the common block partition from among a set of different block partitions, and serially evaluates the different block partitions for each of the color components.

* * * * *